United States Patent
Roberson

[15] 3,690,049
[45] Sept. 12, 1972

[54] BROCCOLI HARVESTER

[72] Inventor: Carlton E. Roberson, 204 North Third St., Patterson, Calif. 95363

[22] Filed: Sept. 16, 1971

[21] Appl. No.: 180,982

[52] U.S. Cl. ............56/13.9, 56/13.3, 56/327, 171/61, 171/27, 171/38, 130/31 R, 146/81
[51] Int. Cl. ..................A01d 45/00, A01d 45/26
[58] Field of Search..............56/327, 13.3–13.9, 56/62, 94, 119; 171/58, 60, 61, 62, 38, 25–28; 130/31 R; 146/81

[56] References Cited

UNITED STATES PATENTS

| | | | |
|---|---|---|---|
| 2,481,462 | 9/1949 | Woodland | 56/62 |
| 2,556,509 | 6/1951 | Thomson | 130/31 R |
| 2,782,581 | 2/1957 | Thomson | 130/31 R |
| 2,973,816 | 3/1961 | Van der Lely | 171/58 |
| 3,095,680 | 7/1963 | Thornton | 130/31 R |
| 3,543,493 | 12/1970 | Duda | 171/38 |
| 3,570,228 | 3/1971 | Phillips | 56/13.7 |

Primary Examiner—Antonio Guida
Attorney—Eckhoff, Hoppe, Slick, Mitchell and Anderson

[57] ABSTRACT

A row crop harvester with a plurality of pairs of resiliently faced elevator belts traveling at about ground speed, one pair for each row of broccoli. As the harvester advances, each pair of belts converges upon and grasps in sequence the standing broccoli stems between them as a sickle mounted below the belts severs them from the growing plants. The belts in each pair travel at slightly different speeds so as to rotate each severed stem about its axis as it is carried past leaf beaters that both remove the leaves from the rotating stem and simultaneously draw each downwardly until its flower resides adjacent the traveling belts. Rotary knives then trim the depending stems to a uniform length and the elevator belts deliver the trimmed stems to a chaff separator and subsequent inspection and loading stations.

7 Claims, 17 Drawing Figures

PATENTED SEP 12 1972 3,690,049

INVENTOR.
CARLTON E. ROBERSON
BY
ATTORNEYS

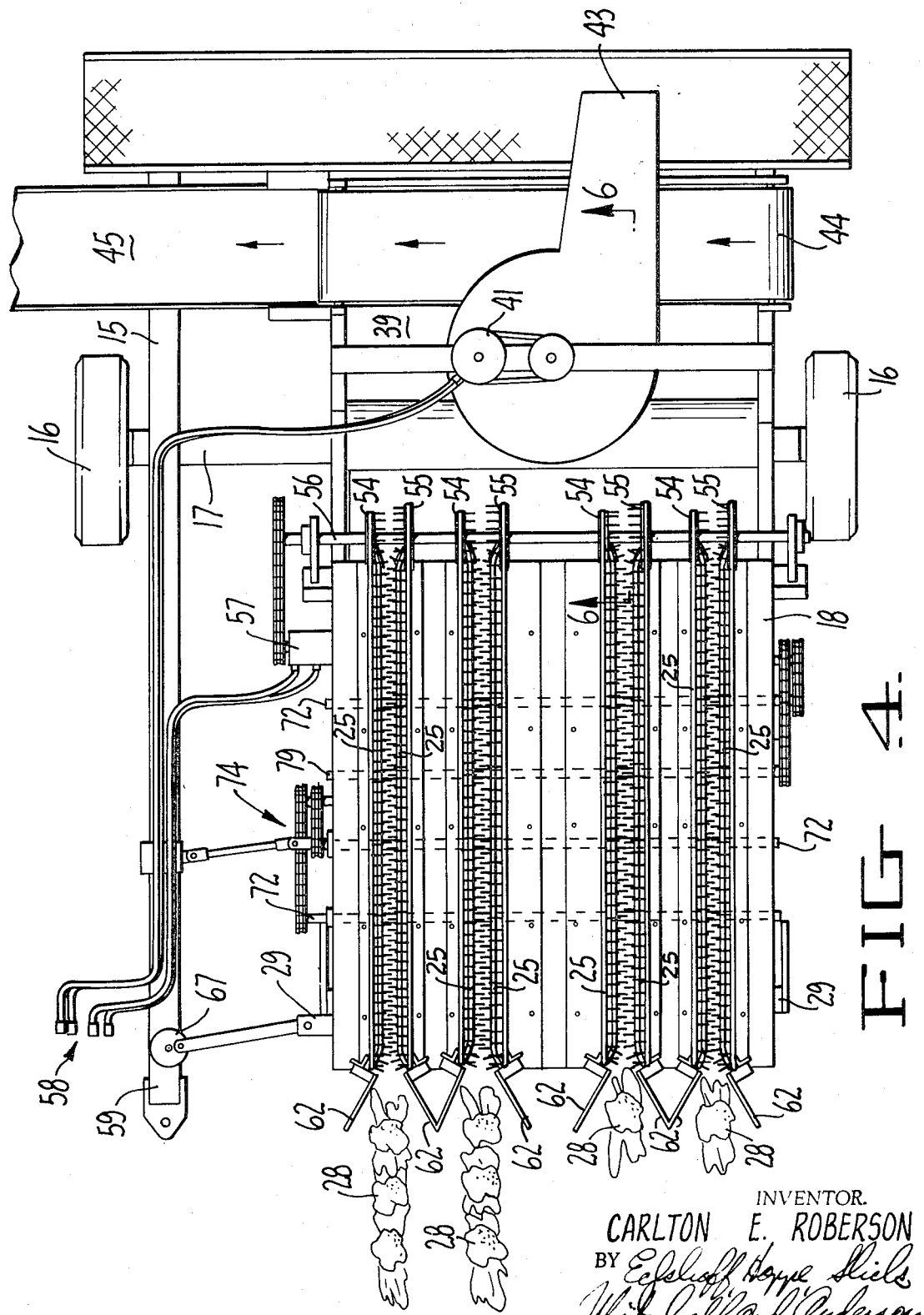

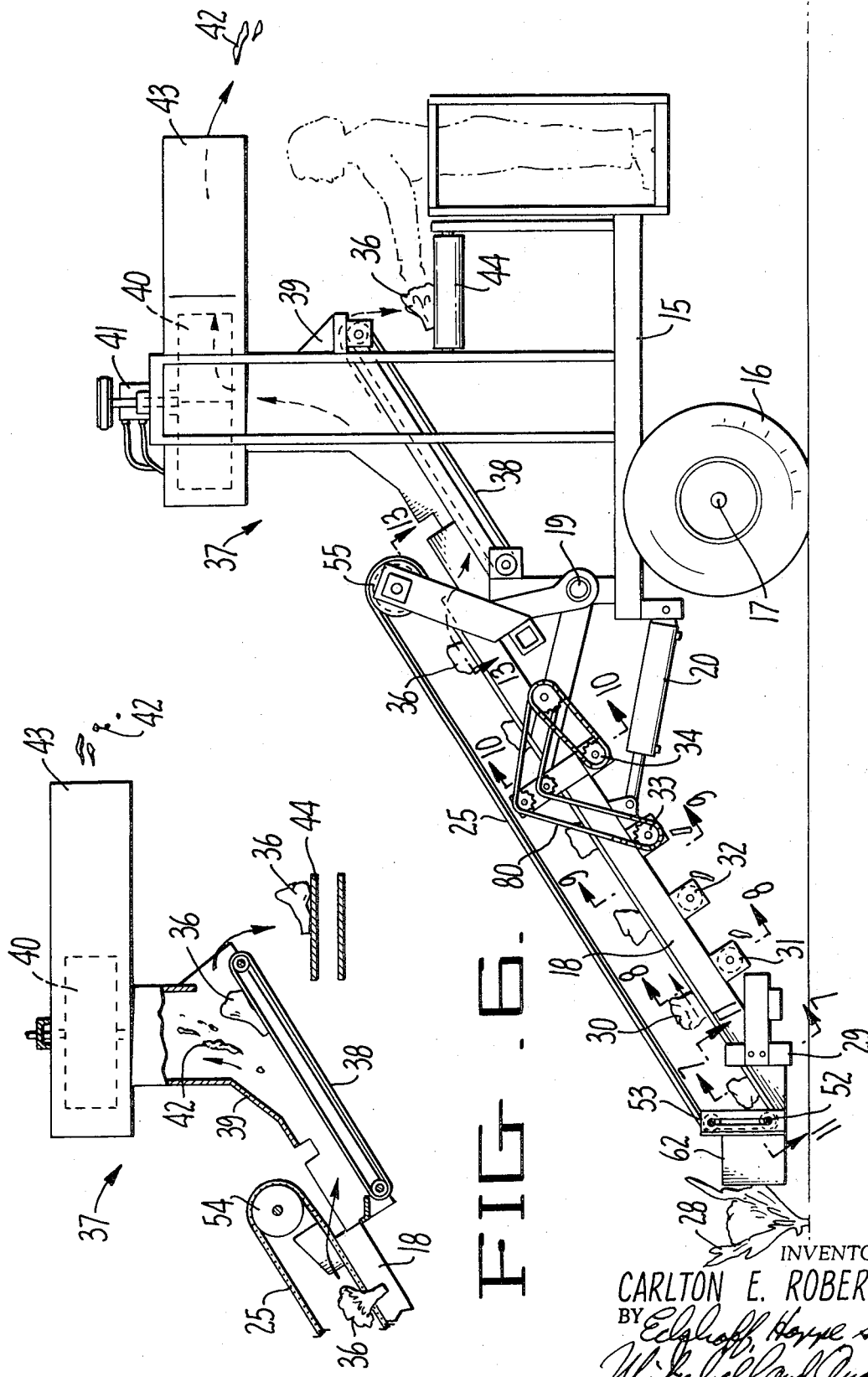

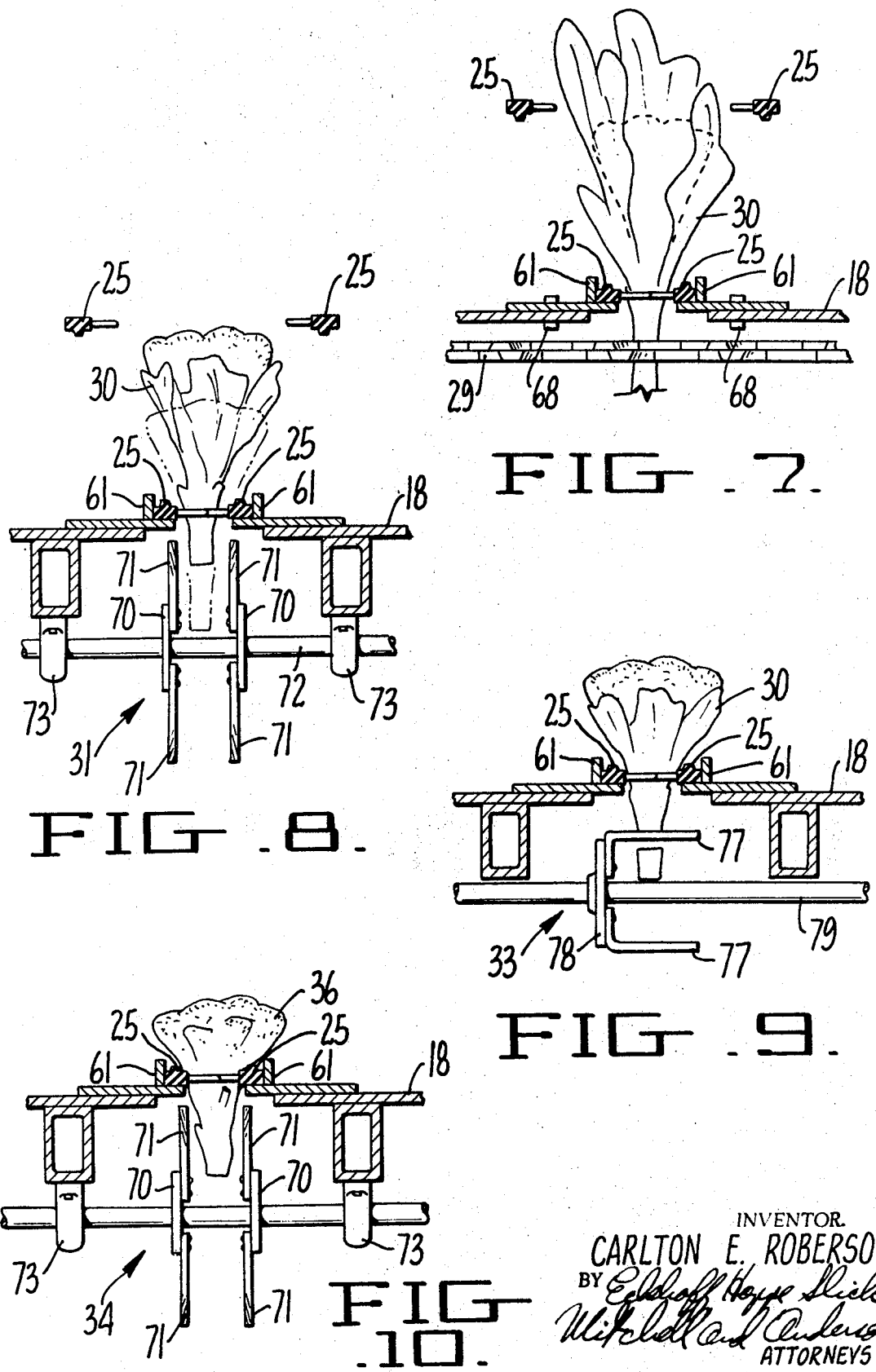

INVENTOR.
CARLTON E. ROBERSON
BY
ATTORNEYS

BROCCOLI HARVESTER

This invention relates generally to row crop harvesters and more particularly to a machine and method for mechanically harvesting broccoli.

Broccoli historically has been harvested by hand. Several factors have made it difficult to mechanize the operation. One factor is the nature of the broccoli plants themselves. They range in height from 2 to 4 feet and an average plant stands approximately 3 feet high. Each plant has an edible flower formed at the tender tip of the stem. Normal, healthy broccoli plants have an abundance of leaves growing off that stem which reside beneath, alongside of, and even above the flower. It is difficult to separate mechanically the abundance of leaves from the tender stem tips and flowers which are desired for harvesting.

The flowers also do not stand at a uniform height above the ground so it is not practical to simply cut the broccoli stems at a given height. This would result in cutting some plants above the flower and some plants through the flower itself. The flowers are very tender and easily bruised. It is important to avoid bruising the flower because bruising causes spoiling.

A primary object of this invention is to provide an apparatus and method for mechanically harvesting broccoli that efficiently separates the flower and stem tips from the remainder of the plant, particularly the leaves, without damaging or bruising the flower.

A further object of this invention is to provide an apparatus and method for mechanically harvesting broccoli with minimum waste of edible portions by gathering virtually all mature plants regardless of the heights at which the flowers stand.

An object of this invention also is to provide an apparatus and method for mechanically deleafing and trimming the harvested broccoli to eliminate the hand labor presently required for both operations.

Other objects and advantages of the invention will become apparent from consideration of the following description of a preferred embodiment and the accompanying drawings wherein FIG. 1 is a side elevational view of the harvester shown advancing along a typical row of broccoli;

FIG. 4 is a top view of the harvester of FIG. 1;

FIG. 5 is a side elevational view of the harvester of FIG. 1;

FIG. 6 is a side elevational view, partly in section, of the chaff separator of harvester taken along the line 6—6 of FIG. 4;

FIG. 7 is a sectional view of the sickle taken along the line 7—7 of FIG. 5;

FIG. 8 is a sectional view of one leaf beater taken along the line 8—8 of FIG. 5;

FIG. 9 is a sectional view of the trimming knives taken along the line 9—9 of FIG. 5;

FIG. 10 is a sectional view of a subsequent leaf beater taken along the line 10—10 of FIG. 5;

Figure 1:
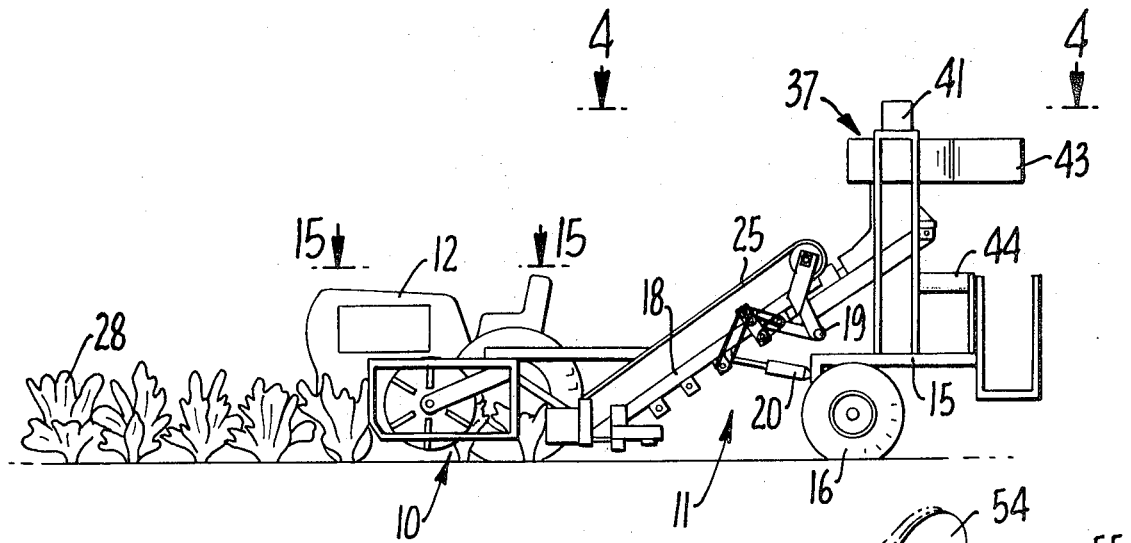

The described embodiment includes a preliminary leaf beater 10 mounted upon and preceding the harvester 11, itself. Tractor 12 draws both of them along the broccoli rows as is shown in FIG. 1. The preliminary leaf beater 10 cuts a swath through the overlapping leaves of the broccoli plant rows to facilitate passage of the harvester 11 along the standing rows and it guides the broccoli stalks into the harvester. In some fields the harvester 11 alone can be used without need for the preliminary leaf beater 10. However, in most fields with heavy leaf growth the preliminary leaf beater greatly enhances the harvesting operation.

The harvester includes a mobile rigid frame, referred to generally as 15, which moves on a pair of wheels 16 rotatable upon axle 17 upon which the frame mounts. The frame 15 also carries an adjustable canted ramp 18 pivoted from the frame at 19 by means of hydraulic ram 20.

The ramp 18 supports a plurality of pairs of endless traveling elevator belts 25. There is one pair of elevator belts for each row of broccoli so that the harvester illustrated in the drawings, particularly FIG. 4, simultaneously harvests four crop rows. Each pair of belts 25 is resiliently faced and in a parallel lower flight 26 for most of their length the belts are spaced apart a distance comparable to that of a typical broccoli stem. The belts at their leading ends of the lower flight at 27 converge upon the standing broccoli plants 28 as the harvester advances down the crop rows. Each pair of converging belts grasps the presented broccoli stalks at about the time they are severed from the growing plant by cutting means 29. The belts 25 carry the severed stems 30 in their parallel lower flight 26 past a first leaf beating means 31, a second leaf beating means 32, trimming means 33 and in the embodiment shown, a third leaf beating means 34. At their trailing ends each pair of elevator belts diverges as at 35 to release trimmed broccoli stems 36 and deliver them to chaff separator 37.

The trimmed broccoli 36 falls upon conveyor belt 38 which carries it beneath suction hood 39 of the chaff separator. The chaff separator in the described embodiment also includes a fan 40 driven by hydraulic motor 41 which develops a partial vacuum in suction hood 39 to draw loose leaves and chaff 42 from the trimmed broccoli and then blows them back onto the field through discharge outlet 43. Conveyor belt 38 delivers the trimmed broccoli stems 36 separated from the chaff to inspection belt 44. There the trimmed broccoli is manually inspected and the accepted ones then passed to loading conveyor 45 for packing.

Figure 3:
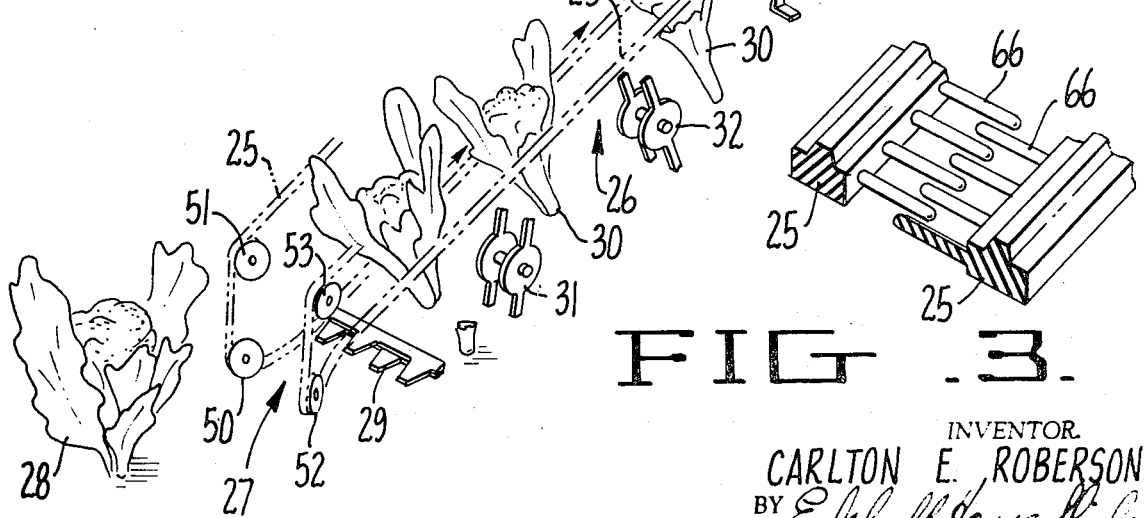
FIG. 3 is an enlarged perspective view of a portion of the particular elevator belts used in the harvester of FIG. 1.
Figure 11:
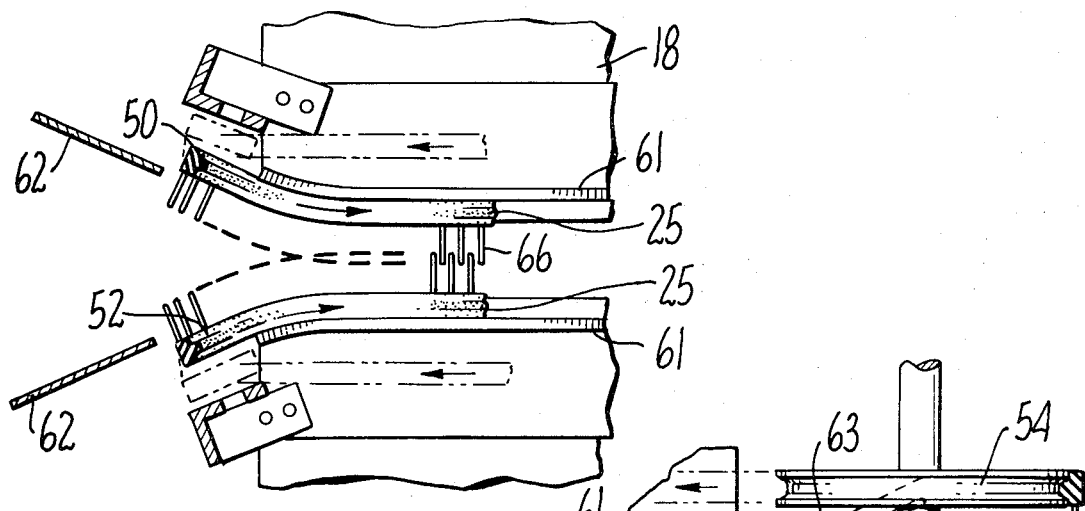
FIG. 11 is a top elevational view, partly in section, of the leading end of a pair of elevator belts taken along the line 11—11 of FIG. 5.
Figure 12:
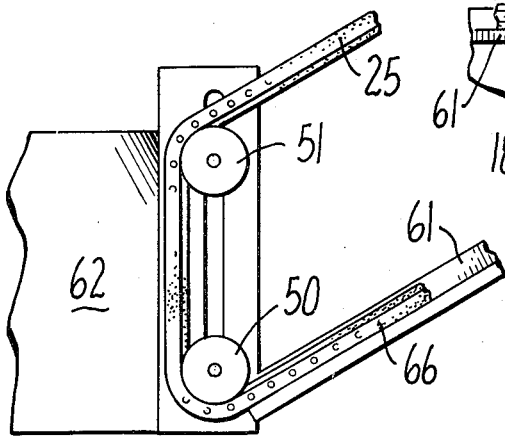
FIG. 12 is an enlarged side elevational view, partly in section, of the leading end of one elevator belt.

Drive means for elevator belts 25 move one of each pair at a different speed than that of the other during operation of the harvester. As shown in FIG. 3 the elevator belts 25 are modified V-belts which at their leading ends train over grooved idler pulleys 50, 51 and 52, 53 respectively, mounted on the forward end of ramp 18. The trailing ends of the elevator belts 25 train over drive pulleys 54, 55 respectively, mounted on a common drive shaft 56. Drive pulley 55 is larger in diameter than drive pulley 54 so that common drive shaft 56 drives the belts at a speed differential. The four pairs of elevator belts in the described embodiment are driven in the same manner.

For a normal harvester speed of about 2 miles per hour down the standing rows, a diameter of 6 inches for drive pulley 54 and diameter of 8 inches for drive pulley 55 have been used with variable speed hydraulic motor 57 rotating the common drive shaft 56 in a speed range of 0 to 200 revolutions per minute. Hydraulic motor 57 operates on hydraulic fluid supplied from and returned to the hydraulic system of tractor 12 as at 58 in FIG. 4. The harvester connects to the draw tractor 12 by means of draw bar 59.

Figure 13:
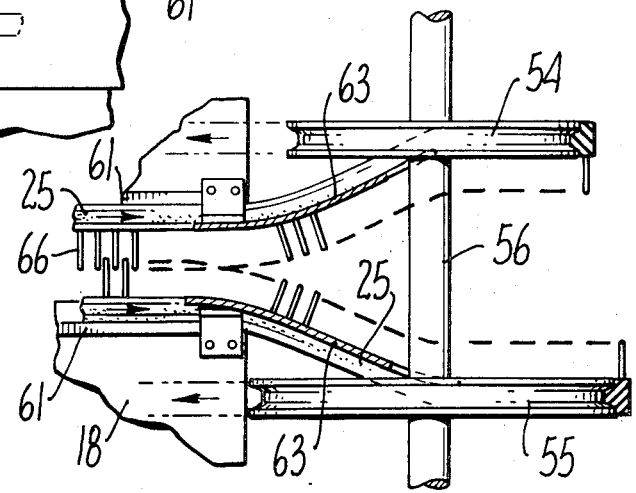
FIG. 13 is a top elevational view, partly in section, of the trailing end of a pair of elevator belts taken along the line 13—13 of FIG. 5.
Figure 14:
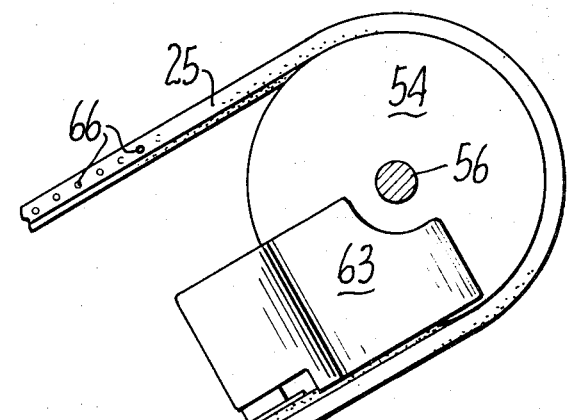
FIG. 14 is a side elevational view of the elevator belt drive shaft and pulley shown in FIG. 5.

Adjustable guide rails 61 bolted to the ramp 18 hold the major portion of the lower flight of each pair of belts 25 in a spaced parallel relationship which corresponds to the thickness of a typical broccoli stem. A pair of convergent guide plates 62 at the leading ends of each pair of belts steer the standing broccoli plants 28 into the converging belts as the harvester moves down each row. At their trailing ends a pair of divergent guide plates 63 extend beyond guide rails 61 to steer the traveling belts into their divergent relationship and onto the spaced drive pulleys 54, 55 respectively as is most clearly shown in FIGS. 13, 14.

The belts 25, themselves, are modified V-belts carrying on their inner edges a resilient facing. In the described embodiment this facing comprises a plurality of approximately one quarter inch diameter resilient rubber fingers 66, 1 inch in length on about three-eighths inch centers, that are vulcanized to the inner edges of each elevator belt 25. These fingers resiliently grasp the tender broccoli stalks and move the severed stems through the manipulative stations along the ramp of the harvester. Other types of resilient facing also are useful such as a soft rubber or plastic strips, etc.

The described resilient fingers 66 extend into the region between the belts 25. The tips of the fingers may overlap. Alternately, overlap may be avoided by making the fingers shorter and stiffer. The preferred design includes a slight overlap of approximately one-fourth inch which enables use of softer fingers which rotate the broccoli stems without bruising and also allow the stems to be drawn downwardly by the leaf beating means so that the flowers reside adjacent the elevator belts 25. Belts 25 in each pair are spaced close enough to each other that fingers 66 can grasp and hold the broccoli stems, but are also spaced far enough apart to allow the fingers to rotate the broccoli about the axis of its stem and the flowers to be positioned slightly above the upper faces of the belts.

Figure 2:
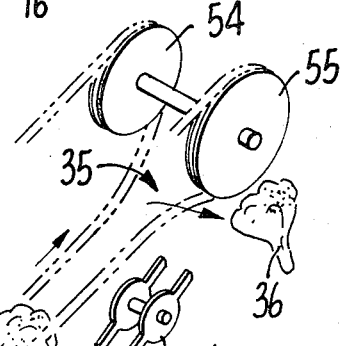
FIG. 2 is a schematic perspective representation of one set of the important components of the harvester of FIG. 1.

Hydraulic ram 20 positions the forward end of ramp 18 at an appropriate height to cut substantially all the broccoli flowers in the particular crop being harvested. This height is readily adjustable during operation from grade to about 24 inches above grade in the harvester shown by ram 20. As harvester 11 moves down the standing rows of broccoli, adjustable guide plates 62 steer each broccoli plant 28 to the converging pairs of elevator belts 25 the lower flights of which converge upon and grasp each broccoli stem as it is severed from the growing plant by cutting means underneath the belts such as the sickle 29 illustrated schematically in FIG. 2 and shown in more detail in FIG. 7. The hydraulic drive 67 operates the sickle.

The pairs of belts then traveling substantially in parallelism carry the severed stems upwardly along ramp 18 past the leaf beating means and trimming means to deliver them to cleated conveyor belt 38 as the elevator belts 25 diverge at their trailing ends. The differential belt speeds rotate each severed stem about the axis of its stem as the belts carry them forward. As is shown in FIG. 7, the guide rails 61 are bolted to the ramp 18 at 68 so that the spacing between the elevator belts 25 can be set to accommodate the broccoli stem size being harvested and assure a firm but resilient grip on the severed stems.

As the belts rotate and carry each stem upwardly along the ramp, leaf beating means remove leaves from the stem and simultaneously draw the stems downwardly to position the broccoli flowers adjacent the top side of the elevator belts. In the described embodiment leaf beaters 31 and 32 for each pair of belts perform this dual function. Leaf beaters 34 remove additional leaves, if there are any, from the trimmed stems. Each of leaf beaters 31, 32, 34 includes a pair of split hubs 70, one mounted on either side of the broccoli stems depending from elevator belts 25 as shown in FIGS. 8 and 10. Each hub carries a pair of stiff protruding rubber arms 71 and is rotatable upon a common leaf beater drive shaft 72 mounted in bearings 73 on the underside of ramp 18. Another hydraulic motor and chain drive referred to generally as 74 in FIG. 4 drives all leaf beaters 31, 32 in the described embodiment and motor 57 drives leaf beaters 34 at approximately 600 r. p. m.

As the depending broccoli stems move past the leaf beaters their arms flail the undesired broccoli leaves from the stems. The flailing action simultaneously draws the depending stems downwardly until each flower resides adjacent to the upper side of the elevator belts as is shown in hidden lines in FIG. 8 and in FIG. 10 for a trimmed stem. Thus, regardless of height at which each flower stands above the ground before harvesting, all of them are positioned adjacent the elevator belts by the time each stem moves to the trimming means 33. The differential belt speeds rotate the stems so that all sides are at one time or another exposed to the leaf removing action of leaf beaters 31, 32 and 34. It has been found that two leaf beaters 31, 32 of the type described preceding the trimming means perform a satisfactory leaf removal and drawing function. In some applications it may be desirable to add more or use fewer leaf beaters than is shown herein.

When the broccoli flowers have all been positioned adjacent the upper sides of elevator belts 25 trimming means 33 cuts or dresses each of the depending broccoli stems to a predetermined uniform length with respect to the broccoli flowers that then reside adjacent the elevator belts. Each trimming means 33 includes a pair of horizontally oriented knives 77 mounted on split hubs 78 that rotate upon a common trimming means drive shaft 79 rotatably mounted on the underside of the ramp 18 as is most clearly shown in FIG. 9. In the described harvester chain drive 80 shown in FIG. 5 rotates the trimming means drive shaft at about 1,000 r. p. m. from drive shaft 72 for leaf beaters 34.

The trimmed stems then pass through leaf beaters 34 and are delivered to cleated conveyor belt 38 in the chaff separator 37 as the elevator belts diverge at their trailing ends. As the trimmed broccoli stems move upwardly on cleated conveyor belt 38 they pass under hood 39 within which fan 40 creates a partial vacuum to draw out chaff and loose leaves from the broccoli stems. The chaff 42 discharges back onto the harvested field through discharge outlet 43 while the trimmed stems pass on to the inspection and loading belts as previously described.

Figure 15:
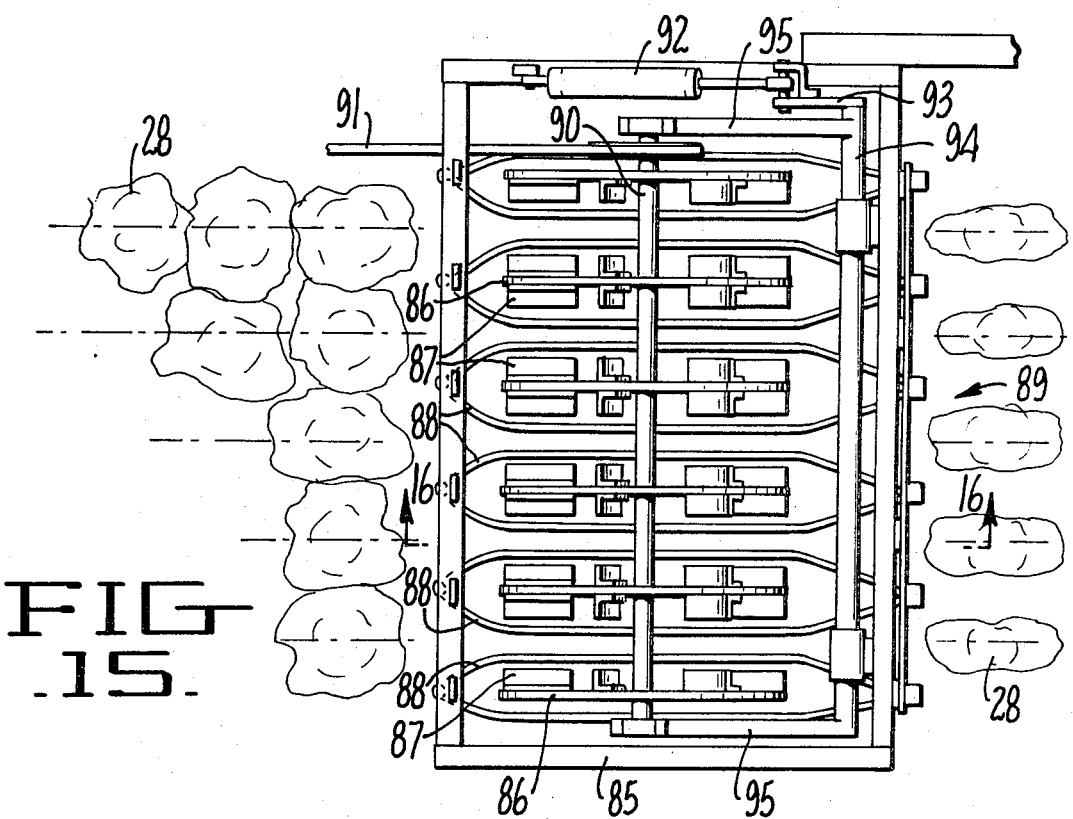
FIG. 15 is a top view of the preliminary leaf beaters taken along the line 15—15 of FIG. 1.
Figure 16:
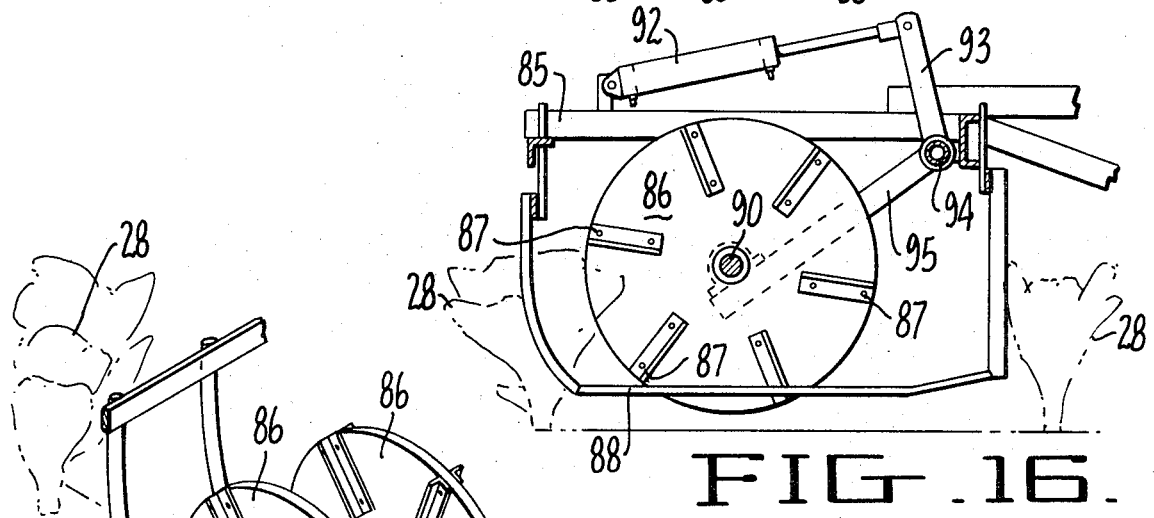
FIG. 16 is a side elevational view of one of the preliminary leaf beater wheels taken along the line 16—16 of FIG. 15.
Figure 17:
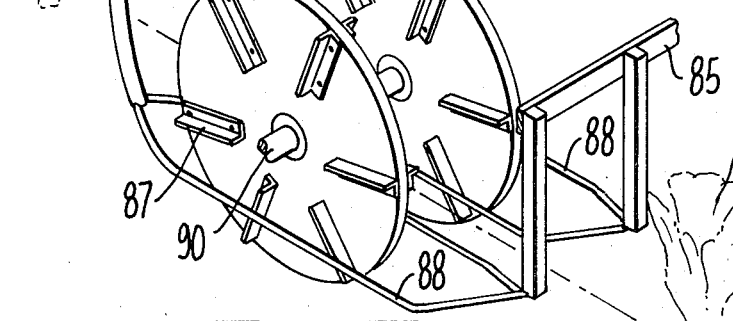
FIG. 17 is a perspective view of one pair of preliminary leaf beater wheels.

FIG. 15 is a top view of the preliminary beater 10 which may be attached to precede the harvester 11. Beater 10 is carried by pipe frame 85 mounted to mobile frame 15 of the harvester. The preliminary beater comprises a plurality of spaced beating wheels a pair of which is shown in perspective in FIG. 17. The circular wheels 86 carry on their vertical faces a plurality of radially disposed vanes 87 which may be made of stiff rubber and be bolted to wheels 86 fabricated of wood. Guide bars 88 hold the stems of standing broccoli plants away from the wheel vanes to prevent damage to the harvestable upper stem and flower but allow the vanes to contact and beat off the outermost leaves of the broccoli plants as the preliminary beater moves down the standing rows with one row between each adjacent pair of wheels as shown in FIG. 15. In this fashion swaths or paths shown in FIG. 15 at 89 are cut through the broccoli leaves to facilitate entrance of the harvester 11 into the standing rows of broccoli. The wheels rotate on a common shaft 90 driven at 91 from the power take-off of tractor 12. The elevation of the rotating wheels can be adjusted by operating hydraulic ram 92 which through linkage 93 pivots shaft 94 rotatably mounted on the beater frame 85. Crank arms 95 at each end of shaft 94 rotatably carry common shaft 90 journaled in their free ends.

The described harvester alone or in combination with the preliminary beater enables a completely automated broccoli harvesting operation to produce de-leafed broccoli flower and stem tips trimmed to market size. This heretofore has not been possible. The particular embodiment of each unit described is for illustrative purposes only. Various modifications and equivalent structures will be apparent to those familiar with the harvester art that are encompassed by the invention defined in the following claims.

I claim:

1. A broccoli harvester comprising
a mobile frame suitable for moving down at least one row at a time of standing broccoli;
cutting means severing each standing broccoli stem in sequence as the frame advances down the row;
at least one pair of resiliently-faced elevator belts which at the leading end of a lower flight converge upon and grasp each broccoli stem as it is severed, then travel substantially in parallelism to carry the stem to a delivery point, and then diverge to release the stem at said delivery point;
leaf beating means along said parallel lower flight for knocking leaves off each broccoli stem and simultaneously drawing it downwardly to position the broccoli flower adjacent said belts;
drive means for moving said belts at different speeds so as to rotate the stems about their axes and expose all sides to said leaf beating means; and
trimming means for dressing each broccoli stem to a predetermined uniform length with the broccoli flower resident adjacent said belts.

2. The broccoli harvester of claim 1 wherein the resilient facing of said elevator belts comprises a plurality of closely spaced, resilient fingers extending into the region between each pair of belts.

3. The harvester of claim 1 wherein said leaf beating means comprises
first and second leaf beaters, each having a pair of hubs carrying protruding arms disposed on either side of said stem and rotating about an axis perpendicular to the path of said elevator belts,
said beaters and belts being so disposed that after each broccoli stem passes through said first beater, it rotates to an orientation such that the remaining leaves are exposed to said second beater.

4. The broccoli harvester of claim 1 further comprising a chaff separator withdrawing loose leaves and chaff from said dressed broccoli stems as they release from the belts at said delivery point.

5. The broccoli harvester of claim 4 further comprising a preliminary leaf beater including
at least one pair of circular wheels for each pair of elevator belts each carrying a plurality of radially disposed vanes;
said wheels rotating about an axis perpendicular to the path of said elevator belts and spaced on opposite sides of a standing row of broccoli thereby contacting said vanes with the leaves of the standing broccoli to clear a swath for the leading end of said belts.

6. A method for harvesting broccoli comprising the steps of
resiliently grasping the stem of a standing broccoli plant;
substantially simultaneously therewith cutting the stem beneath the point at which it is grasped;
transporting the broccoli after cutting to a delivery point while performing the intermediate steps of
continuously rotating the severed broccoli about the axis of its stem;
beating leaves off the stem of the broccoli as it rotates and simultaneously drawing the stem into a position wherein the flower is in a common alignment with flowers of adjacent stems; and
then trimming each stem to a predetermined length.

7. The method of claim 6 further comprising a final step of moving the trimmed broccoli through a partial vacuum to separate from it loose waste material.

* * * * *